United States Patent
Lin

(10) Patent No.: US 10,344,787 B2
(45) Date of Patent: Jul. 9, 2019

(54) SIDE LOCK SLEEVE ASSEMBLY

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 240 days.

(21) Appl. No.: 15/346,735

(22) Filed: Nov. 9, 2016

(65) Prior Publication Data
US 2018/0128298 A1    May 10, 2018

(51) Int. Cl.
*F16B 7/14* (2006.01)
*F16B 7/18* (2006.01)
*F16M 11/28* (2006.01)

(52) U.S. Cl.
CPC .......... *F16B 7/1418* (2013.01); *F16B 7/1472* (2013.01); *F16B 7/182* (2013.01); *F16M 11/28* (2013.01); *F16B 7/185* (2013.01); *Y10T 403/32501* (2015.01); *Y10T 403/4949* (2015.01); *Y10T 403/7084* (2015.01)

(58) Field of Classification Search
CPC .......... F16B 2/065; F16B 7/0426; F16B 7/10; F16B 7/105; F16B 7/1418; F16B 7/1472; F16B 7/182; Y10T 403/32475; Y10T 403/32501; Y10T 403/32508; Y10T 403/4617; Y10T 403/4641; Y10T 403/4949; Y10T 403/7067; Y10T 403/7081; Y10T 403/7084
USPC ...... 403/109.2, 109.5, 109.6, 236, 279, 280, 403/374.3, 379.1, 379.3
See application file for complete search history.

(56) References Cited

U.S. PATENT DOCUMENTS

| | | | | |
|---|---|---|---|---|
| 6,676,095 | B2* | 1/2004 | Dal Pra' | F16B 7/1418 24/20 LS |
| 9,291,205 | B2* | 3/2016 | Widenmeyer | F16D 1/0847 |
| 9,981,707 | B1* | 5/2018 | Chen | B62K 5/001 |
| 2008/0298886 | A1* | 12/2008 | Chen | B62K 19/36 403/373 |
| 2012/0001416 | A1* | 1/2012 | Peng | F16M 11/28 285/145.1 |

FOREIGN PATENT DOCUMENTS

WO    WO-2010139545 A1 * 12/2010 ......... E04H 12/2269

* cited by examiner

*Primary Examiner* — Josh Skroupa
(74) *Attorney, Agent, or Firm* — Lin & Associates Intellectual Property, Inc.

(57) ABSTRACT

A side lock sleeve assembly includes: a first tube, a sleeve having a first coupling portion defining a first receiving space for sleeving over the first tube, wherein a hole is formed on the first coupling portion at a position between a center of the first receiving space and an outer surface of the sleeve; and a fastening screw having an operation section and an extension section, wherein a diameter of the screw gradually decreases from the operation section toward the extension section such that threadedly extension of the extension section through the hole to retain the extension section between the sleeve and the first tube and such that threadedly insertion of the extension section of the screw through the hole results in a threaded fitting portion on an outer surface of the first tube complementing with the extension section, thereby snugly receiving the extension section of the screw therein.

6 Claims, 12 Drawing Sheets

SIDE LOCK SLEEVE ASSEMBLY

BACKGROUND OF THE INVENTION

1. Field of the Invention

The present invention relates generally to a tube assembly, and more particularly to a side lock sleeve assembly for use in an equipment, such as tripod camera stand and the likes.

2. The Prior Arts

A conventional tube assembly generally includes a basic tube and a sleeve and a plurality of fixing means are used for fixing the sleeve relative to the basic tube. The most general fixing means is that a fastening screw is inserted through the sleeve and the basic tube for fixing the two relative to each other. Such type of fixing method is only suitable for the basic tube having a relative wall thickness and in case of the basic tube with thin wall thickness, after the fixing operation, wobbling may result between the sleeve and the basic tube.

The tube assemblies employed in portable tables, chairs in camping campus and tripod camera stand tend toward light weight in general. Due to advance of technology, the wall confining the tube is constructed thinner but stronger in rigidity and it is noted that only the fixing means remain unchanged presently and are not suitable for the presently available tube assemblies, the conventional fixing means are intended for tubes with relatively thick walls. If a traditional fastening screw is inserted through the sleeve and the basic tube for fixing the two together, disengagement therebetween may easily occur due to small area engagement contact between the traditional fastening screw and the basic tube having relatively small wall thickness.

Therefore, the inventor feels there should be a new tube assembly that can eliminate the drawbacks encountered during use of the traditional fastening screw.

SUMMARY OF THE INVENTION

The primary objective of the present invention is to provide a side lock sleeve assembly that is durable and stable and that can be implemented with a basic tube regardless of its wall thickness.

Accordingly, a side lock sleeve assembly of the present invention includes: a first tube; a sleeve having a first coupling portion defining a first receiving space for sleeving over the first tube, wherein a hole is formed on the first coupling portion at a position between a center of the first receiving space and an outer surface of the sleeve; and a fastening screw having an operation section and an extension section, wherein a diameter of the fastening screw gradually decreases from the operation section toward the extension section such that the extension section extends threadedly through the hole in order to retain the extension section between the sleeve and the first tube; wherein, threadedly insertion of the extension section of the fastening screw through the hole on the first coupling portion results in a threaded fitting portion on an outer surface of the first tube and the threaded fitting portion complements with the extension section, thereby snugly receiving the extension section of the fastening screw therein and preventing disengagement of the sleeve and the first tube relative to each other.

By utilizing the side lock sleeve assembly of the present invention, the sleeve can be stably mounted on the first tube at a preset position and hence is prevented from rotation or sliding relative to the first tube even under the outside influence. The sleeve further has a second coupling portion adjacent to the first coupling portion, wherein the second coupling portion has a connection seat and a coupler screw extending upwardly and axially from the connection seat such that a camera carrier or a projection carrier can be mounted on the coupler screw. Alternately, the tube assembly of the present invention can be implemented in a camera tripod, which is another usage of the present invention.

According to a second embodiment of the present invention, the second coupling portion defines a second receiving space. The slide lock sleeve assembly further includes a second tube having a diameter smaller than that of the first tube and extending slidably through the second receiving space and into the first tube, and a fixing element disposed on the second coupling portion for fixing the second tube and the first tube relative to each other. In other words, the tube assembly of the present invention can be implemented in a camera tripod stand as telescopic assembly.

According to a third embodiment of the present invention, the sleeve is formed with at least three rod pivot portions extending radially and outwardly from an outer peripheral wall surface of the sleeve. The side lock sleeve assembly further includes at least three supporting rods, each supporting rod is connected pivotally to a respective one of the rod pivot portions. In other words, the tube assembly of the present invention can serve as a folding device in a tripod stand.

According to a fourth embodiment of the present invention, the side lock sleeve assembly includes two first tubes and two fastening screws while the sleeve has two first coupling portions, each first coupling portion defining a first receiving space for sleeving over a respective one of the first tubes, wherein the hole is formed on each of the first coupling portions at a position between a center of a respective one of the first receiving spaces and the outer surface of the sleeve, wherein threadedly insertion of the extension section of a respective one of the fastening screws through the corresponding hole on the respective one of the first coupling portions results in the threaded fitting portion on the outer surface of the respective one of the first tubes and the threaded fitting portion complements with the extension section of the respective one of the fastening screws, thereby snugly receiving the extension section of the respective one of the fastening screws therein. In other words, the tube assemblies of the present invention can be used for forming assemble frame, tea tables, clothes hanger and wardrobes.

To be more specific, in the side lock sleeve assembly of the present invention, since the threaded fitting portion is formed on the outer surface of the first tube and the threaded fitting portion complementing with the extension section of the fastening screw, a greater engagement contact area is formed among the fastening screw, the first tube and the sleeve after assembly, thereby providing a stable engagement thereamong and eliminating prior drawbacks. Note the first tube employed in the tube assembly of the present invention is durable and light in weight, and there is no need to do the aligning of the fastening screw relative to the hole during the fixing process, thereby providing swift assembly of products and is suitable for mass production process.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
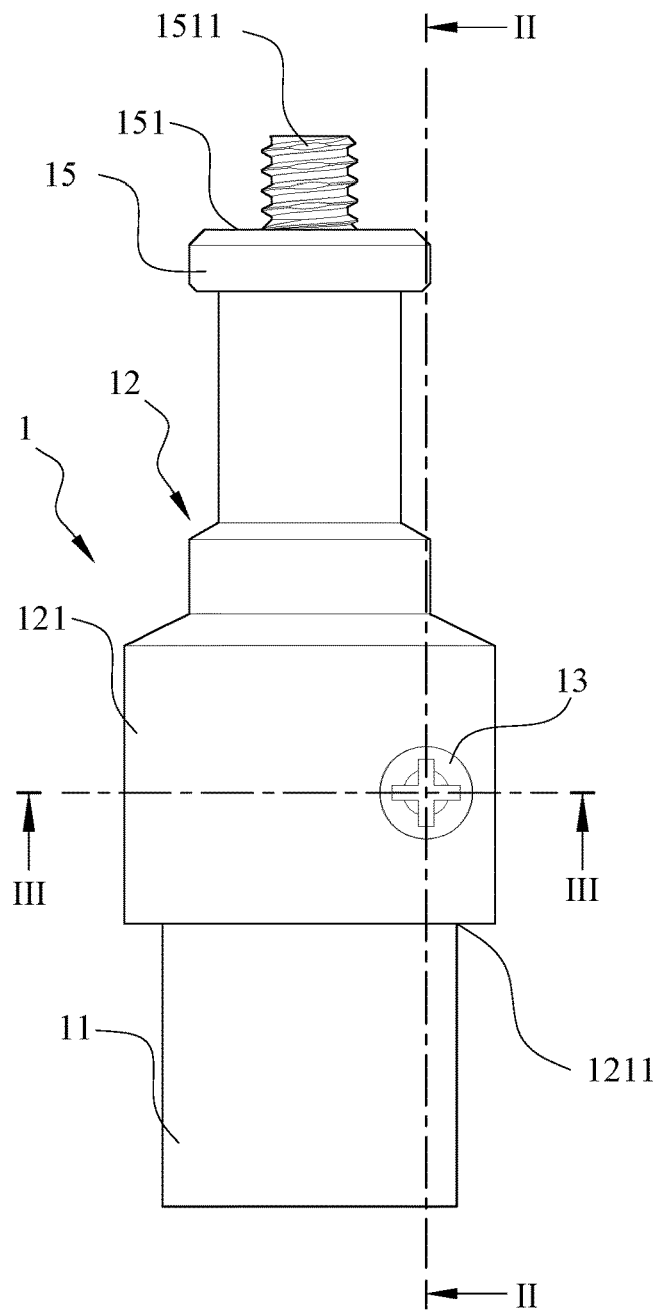
FIG. 1 is a schematic view of a side lock sleeve assembly according to a first embodiment of the present invention.
Figure 2:
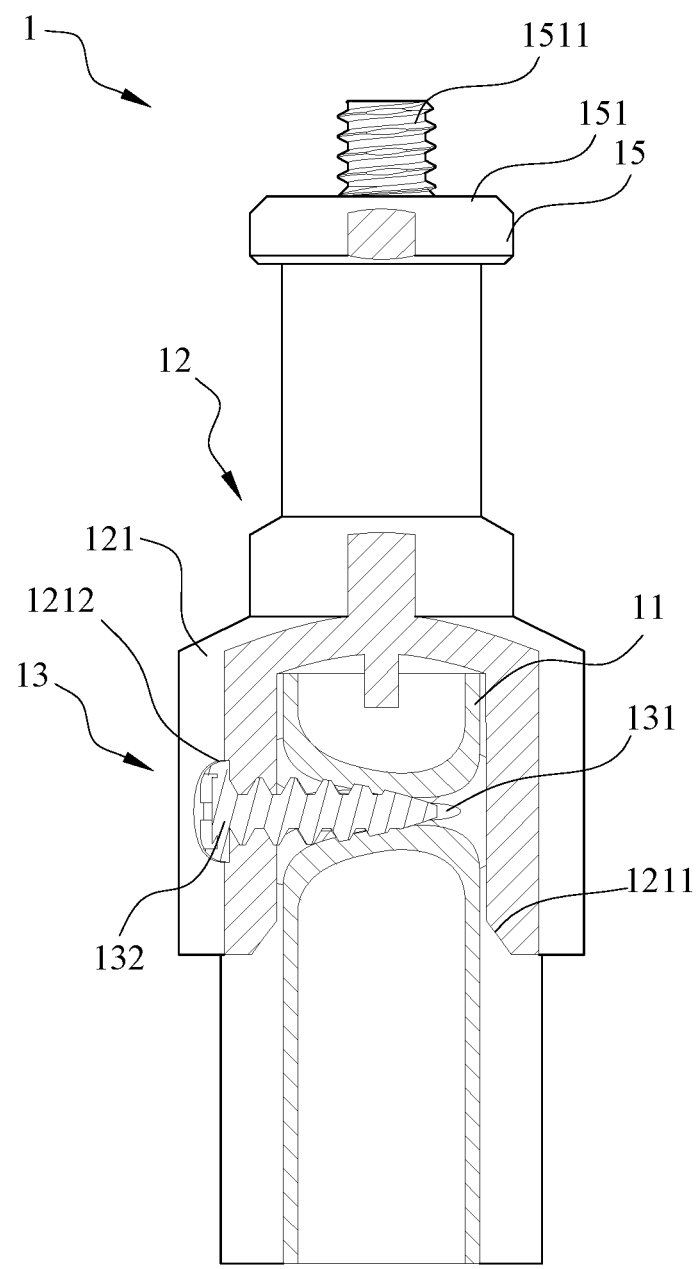
FIG. 2 is a fragmentary sectional view of the side lock sleeve assembly according to the first embodiment of the present invention taken along a line II-II of FIG. 1.
Figure 3:
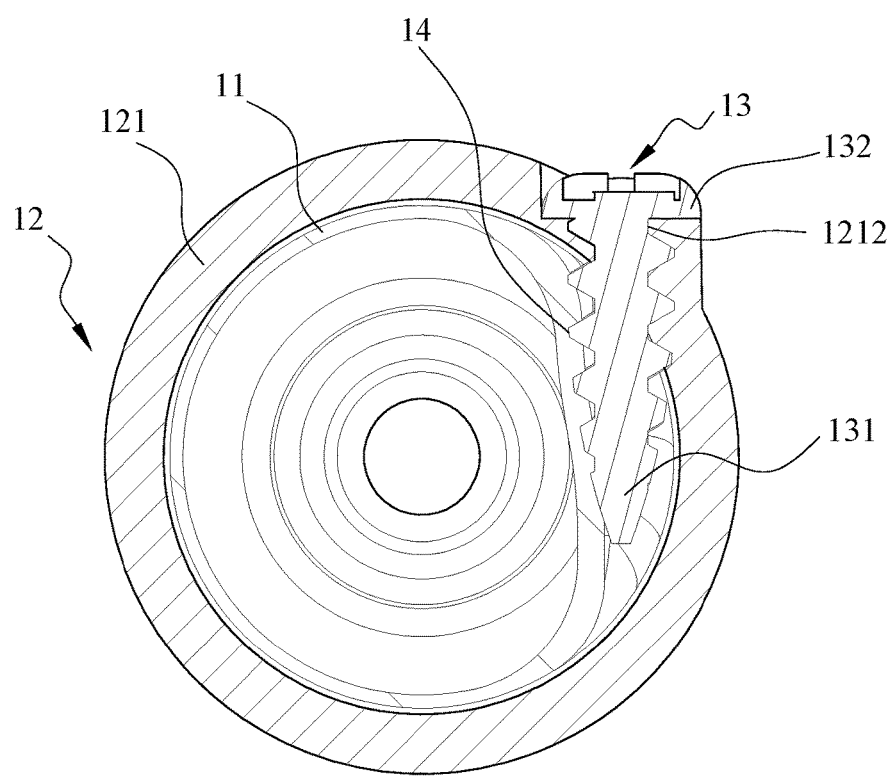
FIG. 3 is a cross sectional view of the side lock sleeve assembly according to the first embodiment of the present invention taken along a line of FIG. 1.

Referring to FIGS. 1 to 3, wherein FIG. 1 is a schematic view of a sleeve assembly according to a first embodiment of the present invention; FIG. 2 is a fragmentary sectional view of the sleeve assembly according to the first embodiment of the present invention taken along a line II-II of FIG. 1 while FIG. 3 is a cross sectional view of the sleeve assembly according to the first embodiment of the present invention taken along a line of FIG. 1. As shown in FIGS. 1 to 3, the side lock sleeve assembly 1 of the present invention includes: a first tube 11, a sleeve 12 and a fastening screw 13. The sleeve 12 has an enlarged first coupling portion 121 defining a first receiving space 1211 for sleeving over the first tube 11, wherein a hole 1212 is formed on the first coupling portion 121 at a position between a center of the first receiving space 1211 and an outer surface of the sleeve 12. The fastening screw 13 has an operation section 132 and an extension section 131, wherein a diameter of the fastening screw 13 gradually decreases from the operation section 132 toward the extension section 131 such that the extension section 131 extends threadedly through the hole 1212 in order to retain the extension section 131 between the sleeve 12 and the first tube 11 and wherein, threadedly insertion of the extension section 131 of the fastening screw 13 through the hole 1212 on the first coupling portion 121 results in a threaded fitting portion 14 on an outer surface of the first tube 11 and the threaded fitting portion 14 complementing with the extension section 131, thereby snugly receiving the extension section 131 of the fastening screw 13 therein and preventing disengagement of the sleeve 12 and the first tube 11 relative to each other. Note the sleeve 12 employed in the side lock sleeve assembly 1 of the present invention is retained stably on the first tube 11 at preset position and hence is prevented from rotation or sliding relative to the first tube 11 even under the outside influence.

According to the first embodiment of the present invention, the sleeve 12 further has a second coupling portion 15 with a narrowed width and located adjacent to the first coupling portion 121. Preferably, the second coupling portion 15 has a connection seat 151 and a coupler screw 1511 extending upwardly and axially from the connection seat 151 such that a camera carrier or a projection carrier can be mounted on the coupler screw 1511. By utilizing the side lock sleeve assembly 1 of the present invention, the sleeve 12 can be stably mounted on the first tube 11 at a preset position and hence is prevented from rotation or sliding relative to the first tube 11 even under the outside influence. Due to this advantages, the side lock sleeve assembly 1 of the present invention can be implemented in a camera tripod, which is another usage of the present invention.

Figure 4:
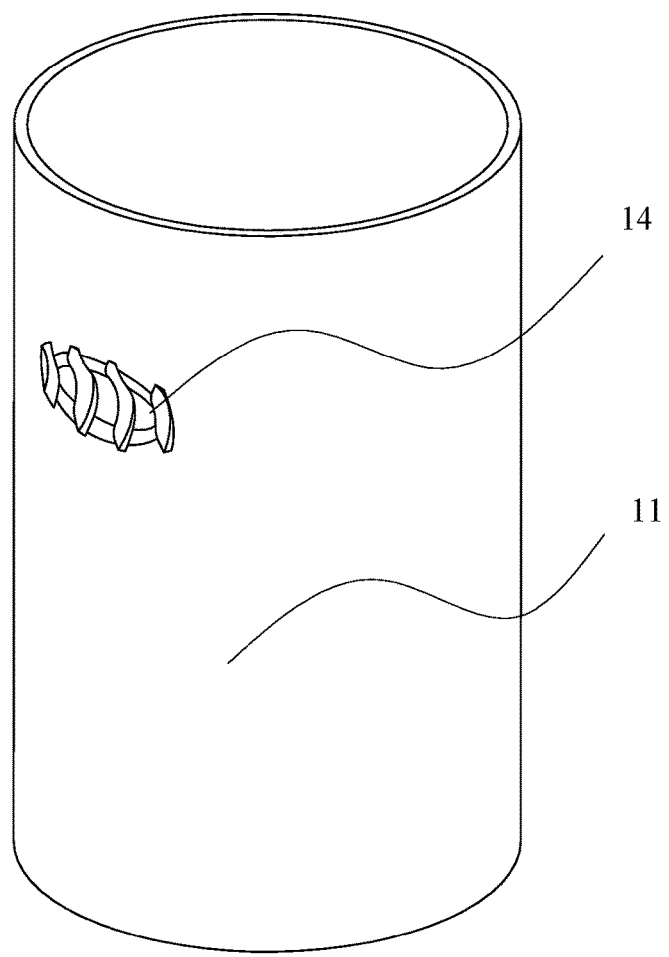
FIG. 4 is an enlarged view of a first tube employed in the side lock sleeve assembly according to the first embodiment of the present invention.

Referring to FIG. 4, wherein FIG. 4 is an enlarged view of a first tube employed in the side lock sleeve assembly according to the first embodiment of the present invention. As best shown in FIG. 4, in the side lock sleeve assembly of the present invention without the sleeve 12, since the threaded fitting portion 14 is formed on the outer surface of the first tube 11 and the threaded fitting portion 14 complements with the extension section 131 of the fastening screw 13, a greater engagement contact area is formed among the fastening screw 13, the first tube 11 and the sleeve 12 after assembly, thereby providing a stable and tight engagement thereamong and eliminating prior drawbacks.

Figure 5:
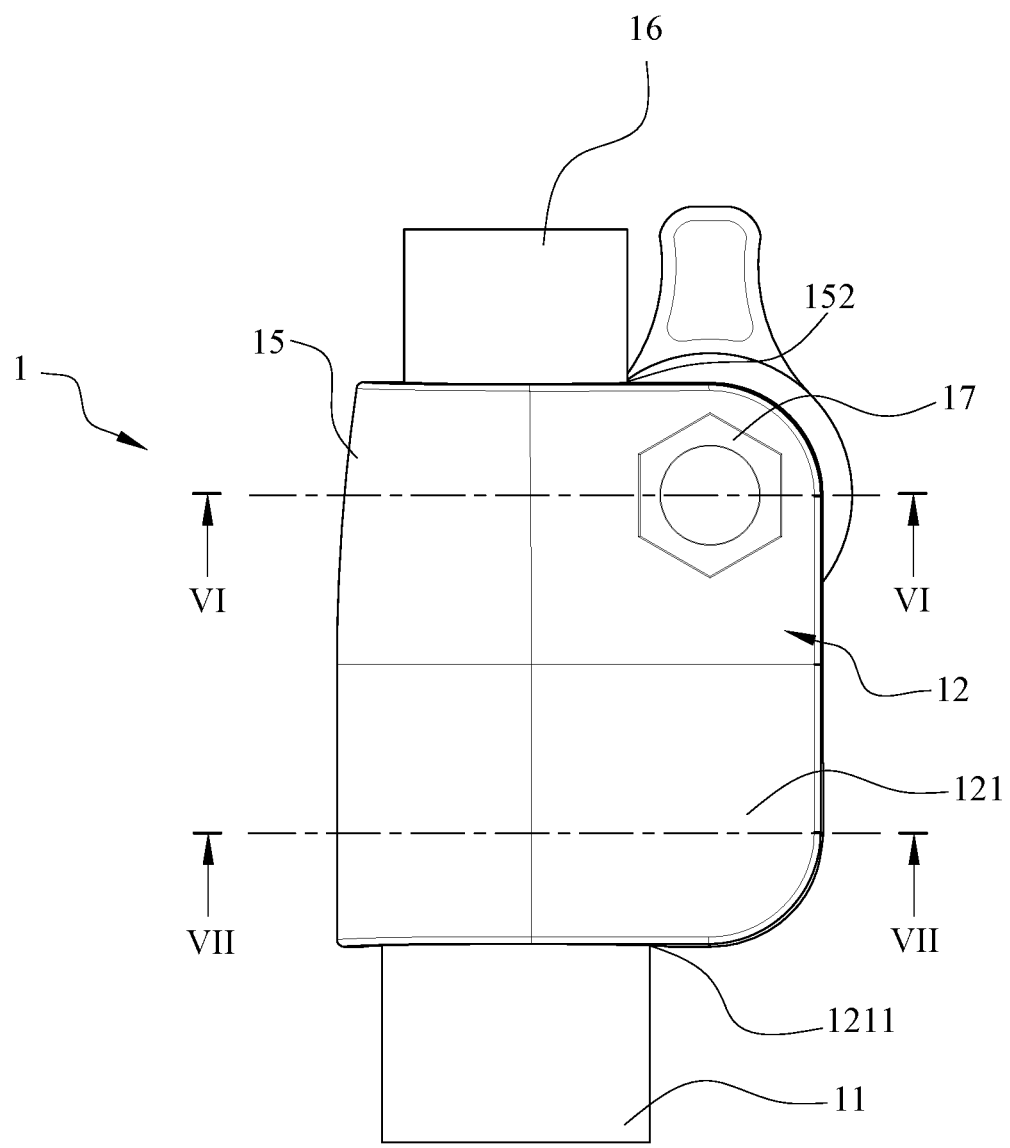
FIG. 5 is a schematic view of a side lock sleeve assembly according to a second embodiment of the present invention.
Figure 6:
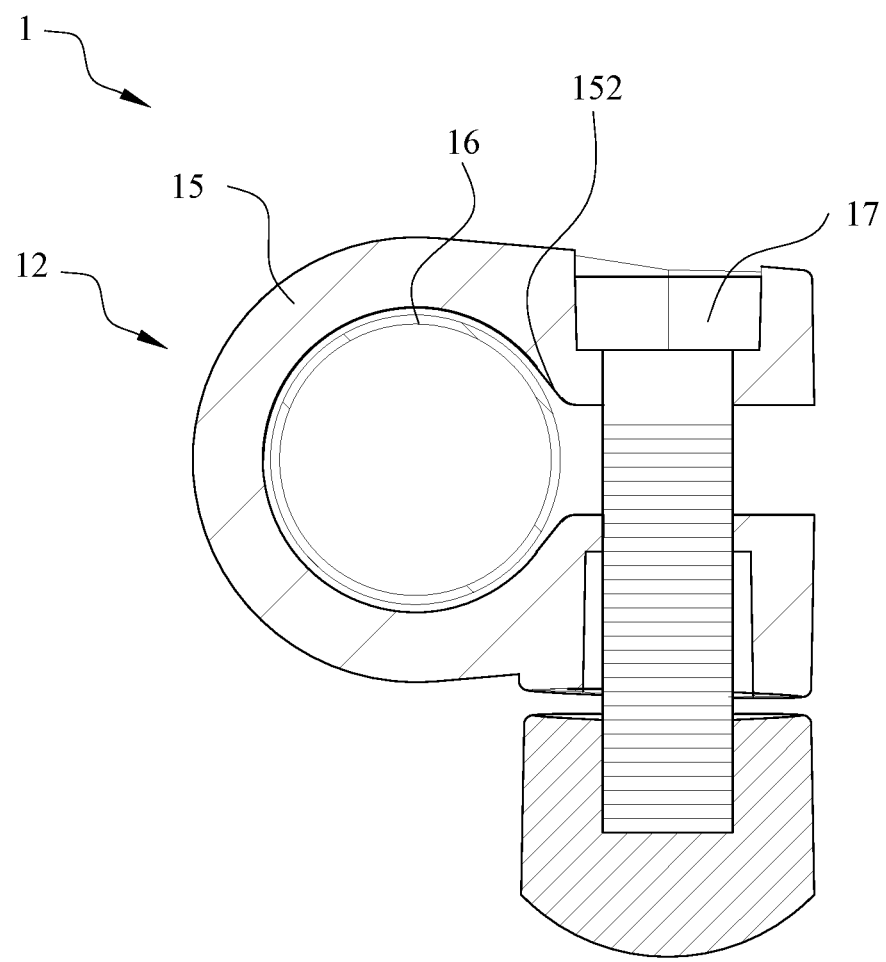
FIG. 6 is a cross sectional view of the side lock sleeve assembly according to the second embodiment of the present invention taken along a line VI-VI of FIG. 5.
Figure 7:
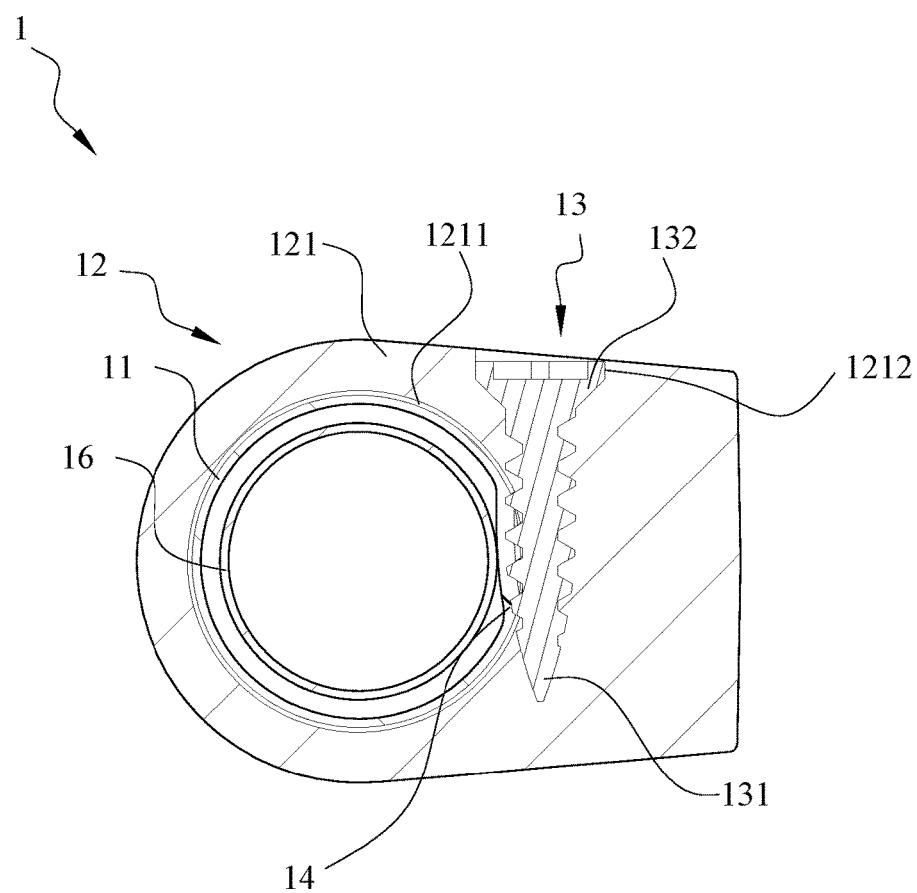
FIG. 7 is a cross sectional view of the side lock sleeve assembly according to the second embodiment of the present invention taken along a line VII-VII of FIG. 5.

Referring to FIGS. 5, 6 and 7, wherein FIG. 5 is a schematic view of a side lock sleeve assembly according to a second embodiment of the present invention; FIG. 6 is a cross sectional view of the side lock sleeve assembly according to the second embodiment of the present invention taken along a line VI-VI of FIG. 5 while FIG. 7 is a cross sectional view of the side lock sleeve assembly according to the second embodiment of the present invention taken along a line VII-VII of FIG. 5. The second embodiment of the present invention is similar to the first embodiment in general, except that the second coupling portion 15 defines a second receiving space 152. The second embodiment further includes a second tube 16 that has a diameter smaller than that of the first tube 11 and that extends through the second receiving space 152 and into the first tube 11, and a fixing element 17 (such as a fixing screw) disposed on the second coupling portion 15 for fixing the second tube 16 and the first tube 11 relative to each other.

As best shown in FIG. 6, the fixing element 17 extends through the second receiving space 152 for fixing the second tube 16 and the first tube 11 relative to each other.

As shown in FIG. 7, a hole 1212 is formed on the first coupling portion 121 at a position between a center of the first receiving space 1211 and an outer surface of the sleeve 12. Note that the first tube 11 extends into the first receiving space 1211 while the fastening screw 13 has the extension section 131 extended threadedly through the hole 1212 in order to retain the extension section between the sleeve 12 and the first tube 11. The side lock sleeve assembly of the second embodiment can serve as one telescopic central tube in a tripod stand.

Figure 8:
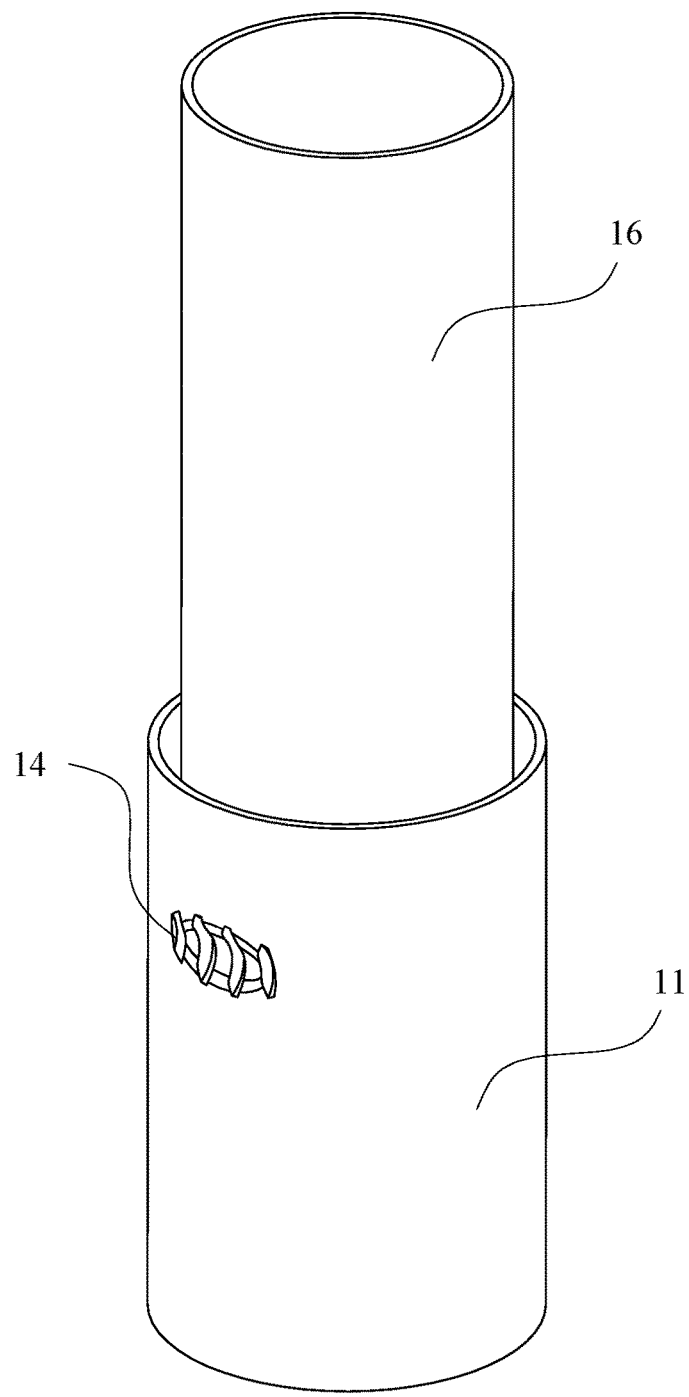
FIG. 8 is an enlarged views of first and second tubes employed in the side lock sleeve assembly according to the second embodiment of the present invention.

FIG. 8 is an enlarged view of first and second tubes employed in the side lock sleeve assembly according to the second embodiment of the present invention without the sleeve 12. Since the threaded fitting portion 14 is formed on the outer surface of the first tube 11 and the threaded fitting portion 14 complements with the extension section 131 of the fastening screw 13, a greater engagement contact area is formed among the fastening screw 13, the first tube 11 and the sleeve 12 after assembly, thereby providing a stable and tight engagement thereamong and eliminating prior drawbacks.

Figure 9:
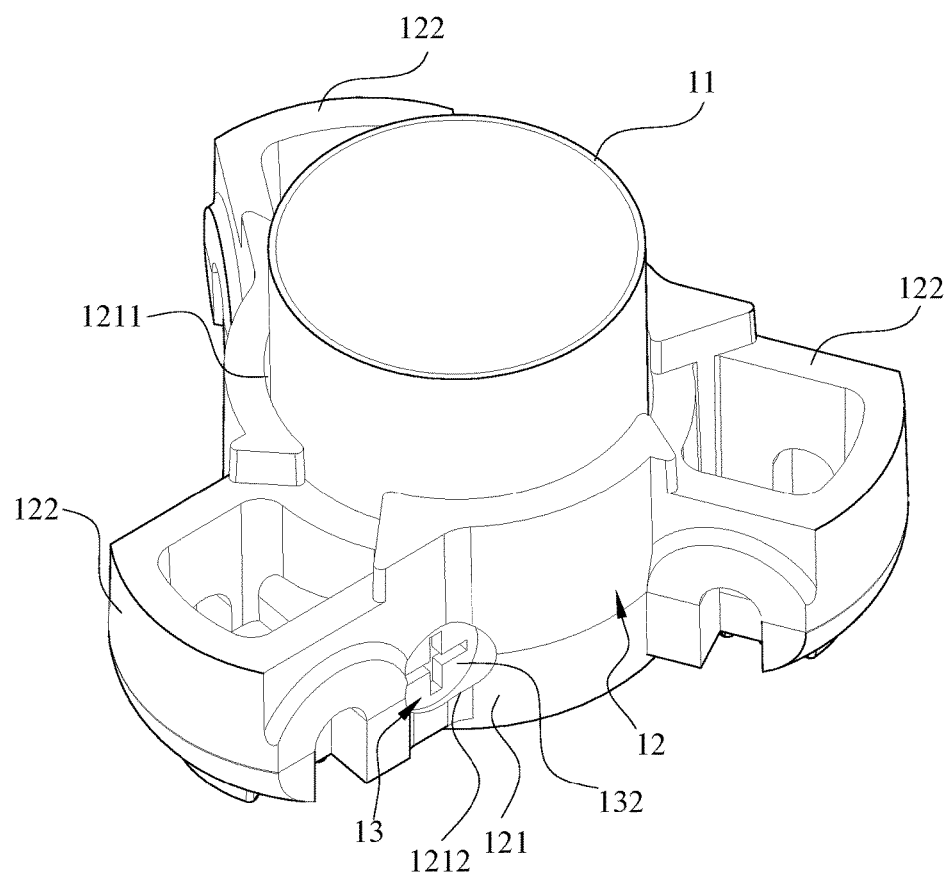
FIG. 9 is a schematic view of a side lock sleeve assembly according to a third embodiment of the present invention.
Figure 10:
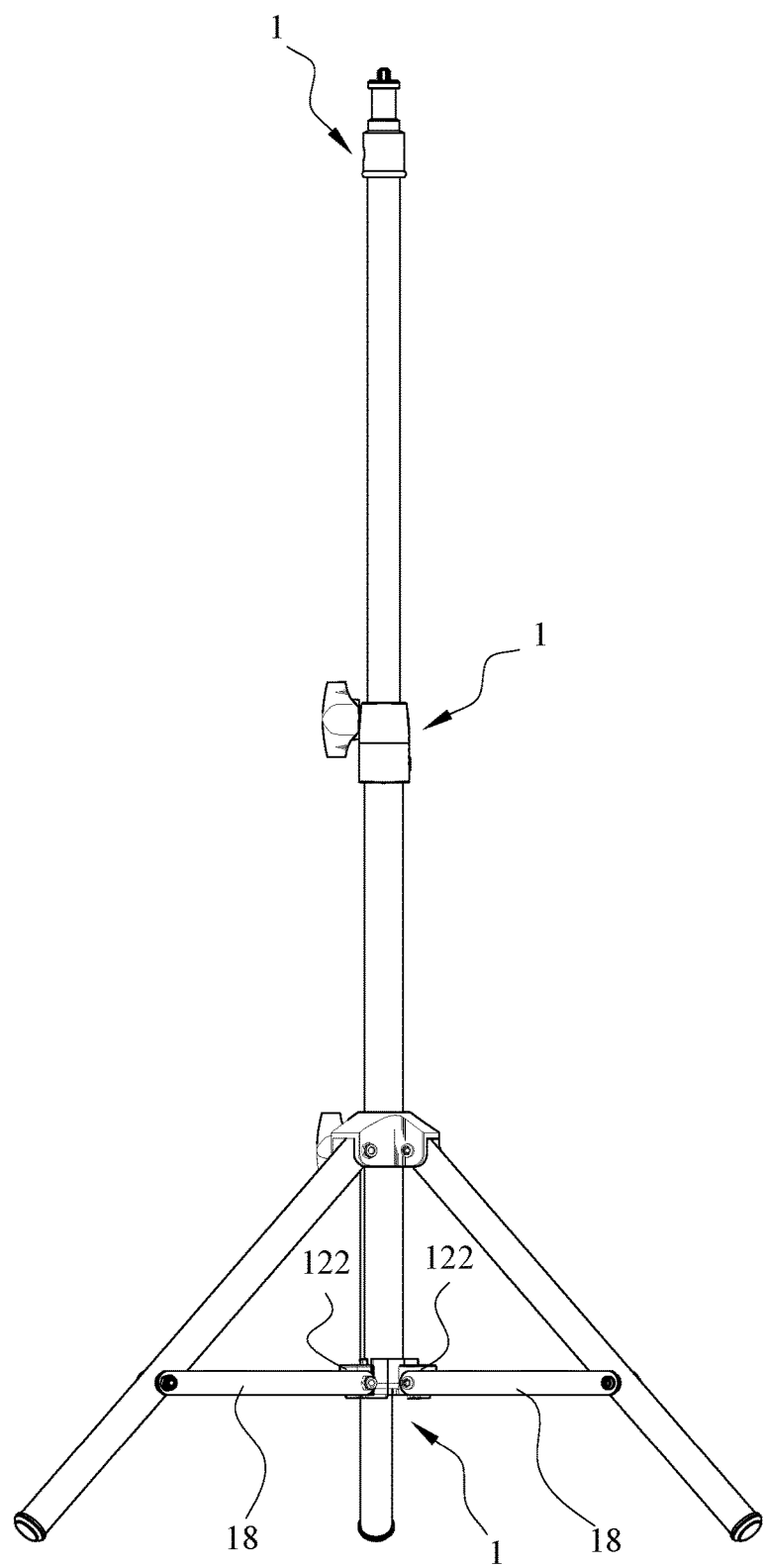
FIG. 10 illustrates how the side lock tube assemblies according the first, second and third embodiments of the present invention are implemented together.

FIG. 9 is a schematic view of a side lock sleeve assembly according to a third embodiment of the present invention. The third embodiment is similar to the first embodiment in general, except that the sleeve 12 is formed with at least three rod pivot portions 122 extending radially and outwardly from an outer peripheral wall surface of the sleeve 12. The third embodiment further includes at least three supporting rods 18, each supporting rod 18 is connected pivotally to a respective one of the rod pivot portions 122 such that the side lock sleeve assembly 1 of the present invention according the first, second and third embodiments can be applied in a tripod camera stand for disposing the camera stand erectly as best shown in FIG. 10, wherein the first embodiment is mounted at the top of tripod stand for holding a camera thereon, the second embodiment is used at the middle of the tripod stand for immobilizing the first and second tubes relative to each other while the third embodiment is used at the bottom of the tripod stand in order to stretch out the support legs and hence disposing the tripod stand erectly on the ground.

Figure 11:
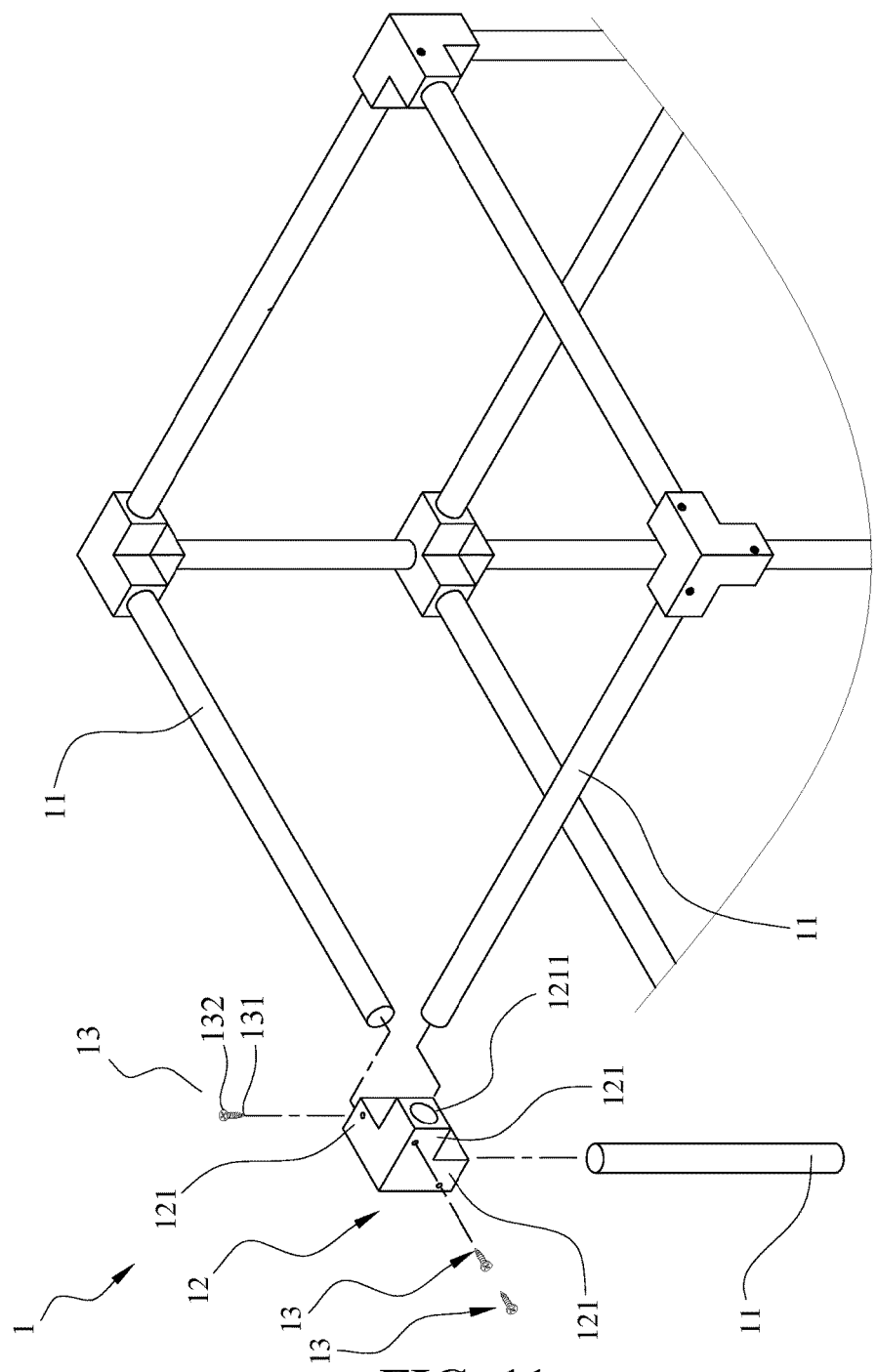
FIG. 11 is an exploded view of a side lock sleeve assembly according to a fourth embodiment of the present invention.
Figure 12:
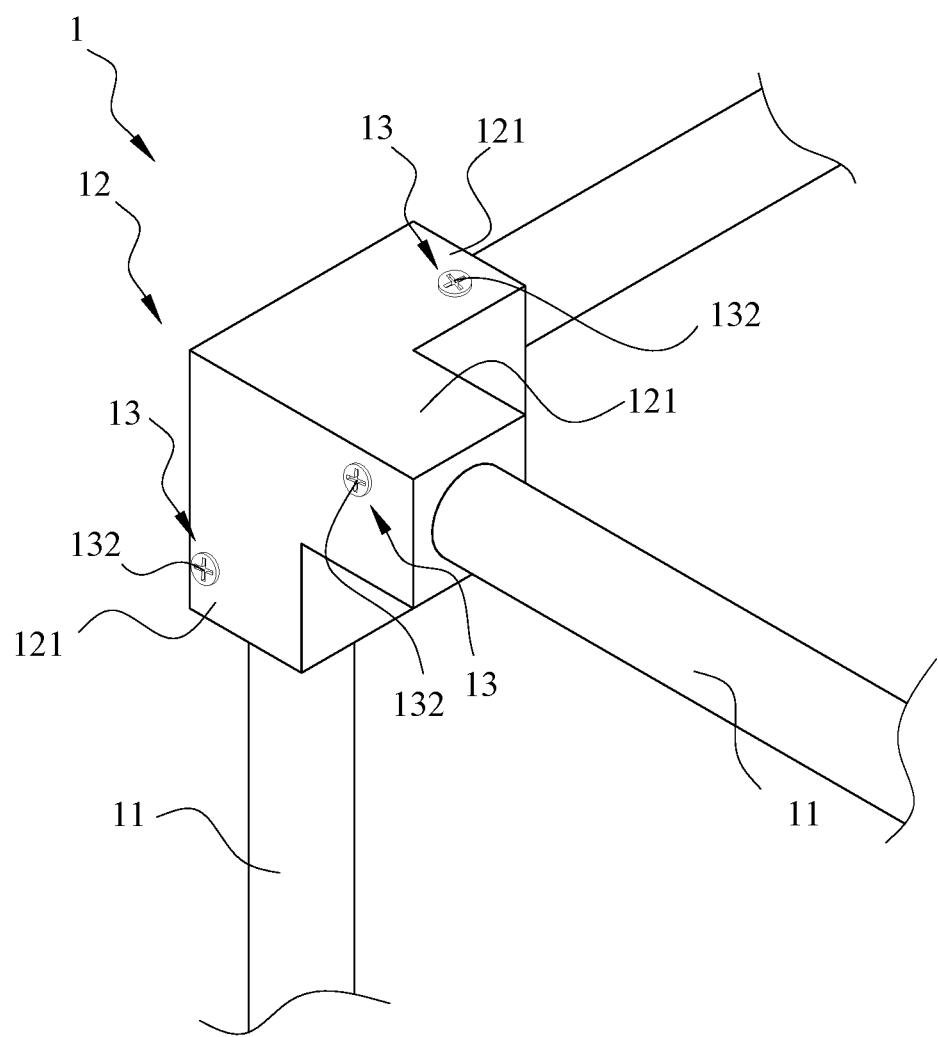
FIG. 12 illustrates a perspective view of the side lock sleeve assembly according to the fourth embodiment of the present invention.

Referring to FIGS. 11 and 12, wherein FIG. 11 is an exploded view of a side lock sleeve assembly according to a fourth embodiment of the present invention; and FIG. 12 illustrates a perspective view of the side lock sleeve assembly according to the fourth embodiment of the present invention. The fourth embodiment is similar to the first embodiment in general, except that the fourth embodiment includes at least two first tubes 11 and at least two fastening screws 13 while the sleeve 12 has at least two first coupling portions 121 each defining a first receiving space 1211 for sleeving over a respective one of the first tubes 11, wherein the hole 1212 is formed on each of the first coupling portions 121 at a position between a center of a respective one of the first receiving space 1211 and the outer surface of the sleeve 12, wherein threadedly insertion of the extension section 131 of a respective one of the fastening screws 13 through corresponding hole 1212 on the respective one of the first coupling portions 121 results in the threaded fitting portion 14 on the outer surface of the respective one of the first tubes 11 and the threaded fitting portion 14 complements with the extension section 131 of the respective one of the fastening screws 13, thereby snugly receiving the extension section 131 of the respective one of the fastening screws 13 therein.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A side lock sleeve assembly comprising:
 a first tube;
 a sleeve having a first coupling portion defining a first receiving space for sleeving over said first tube, wherein a hole is formed on said first coupling portion at a position between a center of said first receiving space and an outer surface of said sleeve; and
 a fastening screw having an operation section and an extension section, wherein a diameter of said fastening screw gradually decreases from said operation section toward said extension section such that said extension section is inserted threadedly through said hole in order to retain said extension section between the sleeve and the first tube;
 wherein, threadedly insertion of said extension section of said fastening screw through said hole on said first coupling portion results in a threaded fitting portion on an outer surface of said first tube and said threaded fitting portion complementing with said extension section, thereby snugly receiving said extension section of said fastening screw therein and preventing disengagement of said sleeve and said first tube relative to each other.

2. The side lock sleeve assembly according to claim 1, wherein said sleeve further has a second coupling portion adjacent to said first coupling portion.

3. The side lock sleeve assembly according to claim 2, wherein said second coupling portion has a connection seat and a coupler screw extending upwardly and axially from said connection seat.

4. The side lock sleeve assembly according to claim 2, wherein said second coupling portion defines a second receiving space, the slide lock sleeve assembly further comprises a second tube having a diameter smaller than that of said first tube and inserted through said second receiving space and into said first tube, and a fixing element disposed on said second coupling portion for fixing said second tube and said first tube relative to each other.

5. The side lock sleeve assembly according to claim 1, wherein said sleeve is formed with at least three rod pivot portions extending radially and outwardly from an outer peripheral wall surface of said sleeve, the side lock sleeve assembly further comprises at least three supporting rods, each supporting rod is connected pivotally to a respective one of said rod pivot portions.

6. The side lock sleeve assembly according to claim 1, comprising at least two pieces of said first tubes and at least two pieces of said fastening screws, said sleeve having at least two of said first coupling portions, each first coupling portion defining said first receiving space for sleeving over a respective one of said first tubes, wherein said hole is formed on each of said first coupling portions at a position between a center of a respective one of said first receiving spaces and said outer surface of said sleeve, wherein threadedly insertion of said extension section of a respective one of said fastening screws through corresponding said hole on the respective one of said first coupling portions results in said threaded fitting portion on said outer surface of the respective one of said first tubes and said threaded fitting portion complementing with said extension section of the respective one of said fastening screws, thereby snugly receiving said extension section of the respective one of said fastening screws therein.

* * * * *